US009653862B2

(12) United States Patent
Bittner

(10) Patent No.: US 9,653,862 B2
(45) Date of Patent: May 16, 2017

(54) ARRANGEMENT HAVING A POWER-ELECTRONIC COMPONENT AND A DC-VOLTAGE BUSBAR

(71) Applicant: Semikron Elektronik GmbH & Co., KG, Nürnberg (DE)

(72) Inventor: Roland Bittner, Stegaurach (DE)

(73) Assignee: Semikron Elektronik GmbH & Co., KG, Nürnberg (DE)

(*) Notice: Subject to any disclaimer, the term of this patent is extended or adjusted under 35 U.S.C. 154(b) by 0 days.

(21) Appl. No.: 15/096,245

(22) Filed: Apr. 11, 2016

(65) Prior Publication Data

US 2017/0025806 A1    Jan. 26, 2017

(30) Foreign Application Priority Data

Apr. 9, 2015    (DE) .......................... 10 2015 105 347

(51) Int. Cl.
*H01L 23/473*    (2006.01)
*H01R 25/16*    (2006.01)
(Continued)

(52) U.S. Cl.
CPC ............ *H01R 25/162* (2013.01); *H01R 4/36* (2013.01); *H01R 13/621* (2013.01); *H02G 5/02* (2013.01); *H01R 2201/26* (2013.01)

(58) Field of Classification Search
CPC ............ H01L 23/473; G06F 2200/201; H05K 7/20927
(Continued)

(56) References Cited

U.S. PATENT DOCUMENTS 8,432,694 B2 *  4/2013  Hentschel ............ H01L 23/473
                                                      165/80.4
2002/0118560 A1 *  8/2002  Ahmed .................. H01L 23/50
                                                      363/144
(Continued)

FOREIGN PATENT DOCUMENTS

DE    10 2007 026 768    12/2008
DE    10 2010 000 908 A1    1/2010
(Continued)

OTHER PUBLICATIONS

German Search Report in corresponding priority case, dated Jan. 18, 2016.

*Primary Examiner* — Hien Vu

(57) ABSTRACT

An arrangement having a DC-voltage busbar and a power component. The power component has two flat DC-voltage connection conductors, each with a contact section and arranged closely adjacent to one another. Each connection conductor has a clamping section beside the respective contact section in the direction of current flow. The busbar has two partial busbars, each with a contact section and arranged closely adjacent to one another. Each partial busbar has a clamping section beside the respective contact section in the direction of current flow. The contact section of at least one connection conductor is electrically connected to the contact section of the associated partial busbar by connecting the clamping sections of the connection conductor to the clamping section of the partial busbars in a flat and force-fitting manner above one another and the respective contact sections therefore lying directly flat on one another.

19 Claims, 2 Drawing Sheets

(51) Int. Cl.
*H02G 5/02* (2006.01)
*H01R 4/36* (2006.01)
*H01R 13/621* (2006.01)

(58) Field of Classification Search
USPC .................................................. 361/699, 689
See application file for complete search history.

(56) References Cited

U.S. PATENT DOCUMENTS

2007/0109715 A1* 5/2007 Azuma .................... B60K 6/48
361/299.3
2011/0304948 A1   12/2011 Lee
2013/0279114 A1* 10/2013 Nishikimi ................ B60K 6/28
361/699

FOREIGN PATENT DOCUMENTS

DE    10 2012 201 766    8/2013
JP         H07-066340    8/1993

\* cited by examiner

ARRANGEMENT HAVING A POWER-ELECTRONIC COMPONENT AND A DC-VOLTAGE BUSBAR

BACKGROUND OF THE INVENTION

1. Field of the Invention

The invention is directed to an arrangement having a power-electronic component, a power component for short, in particular in the form of a power semiconductor module or a capacitor of a power-electronic circuit.

2. Description of the Related Art

It is customary in the art for power-electronic circuits to have both configurations of the power component, in which case the power semiconductor module is connected to the capacitor by means of a DC-voltage busbar. Such power-electronic circuits are used in power-electronic systems which are used, by way of example and without restricting generality, in vehicles as main or auxiliary drives for the purpose of controlling and supplying electrical machines.

A power-electronic system having a multi-part housing having at least one cover and a frame-like housing part is known from DE 10 2012 201 766 A1. Said system has connectors, an internal DC-voltage busbar, a power-electronic circuit arrangement in the form of one or more power semiconductor modules and a capacitor covered with a first cover.

Power semiconductor modules for such systems are known by way of example from DE 10 2007 026 768 A1. That document describes a pressure-contact-connected three-phase current converter module having a substrate with a plurality of power semiconductor components per phase in each case, a housing, a pressure element and load-connection and auxiliary-connection elements leading outwards. The respective substrate has an insulating-material body and conductor tracks with load and auxiliary potentials. The load-connection elements, that is to say the DC-voltage and AC-voltage connection conductors, are each designed as molded metal bodies with external contact devices, a strip-like section and contact feet arranged in a row starting from the strip-like section.

A permanent requirement in the case of such arrangements or systems is the low-inductance configuration of the arrangement consisting of the power component and the DC-voltage busbar.

SUMMARY OF THE INVENTION

It is an object of the invention is to provide an improved low-inductance arrangement having a power component and a DC-voltage busbar, in which case, at the same time, the line cross sections of the DC-voltage busbar and of the DC-voltage connection conductors are not narrowed at the respective connection points in order to obtain the current-carrying capacity and, at the same time, the leakage inductance of the DC-voltage busbar and of the DC-voltage connection conductors is particularly low, in particular at their contact points for electrically conductive connection.

The arrangement according to the invention is designed to have a DC-voltage busbar and a power component. The power component has first and second DC-voltage connection conductors which are flat and each have a contact section. The DC-voltage connection conductors have a first width and a first cross-sectional area in their course to the respective contact sections and are arranged closely adjacent to one another in this course in the direction of their respective normal vector there. The DC-voltage connection conductors have a clamping section laterally beside the respective contact section in the direction of current flow. The DC-voltage busbar has first and second partial busbars each with a contact section, a first width and a first cross-sectional area in their course to the respective contact sections and are arranged closely adjacent to one another in this course in the direction of their respective normal vector there. The partial busbars have a clamping section laterally beside the respective contact section in the direction of current flow.

According to the invention, the contact section of at least one of the DC-voltage connection conductors is electrically conductively connected in a polarity-conforming manner to the contact section of the associated partial busbar by virtue of the clamping section of the DC-voltage connection conductor being connected to that clamping section of the partial busbars in a flat and force-fitting manner above one another by means of a connector and the respective contact sections therefore lie directly flat on one another with contact surfaces assigned to them.

The term "closely adjacent" should be understood in the present document as meaning "at a short distance", in which case the short distance is either sufficient per se for the region in between to ensure electrical insulation, or an insulating means, for example a plastic film, is arranged in between for the purpose of insulation. In other words, a short distance means a sufficient distance to ensure electrical insulation in the case of different polarities.

A "contact section" should be understood in the present document as meaning in each case that region of a DC-voltage connection conductor or a partial busbar which produces a direct flat electrically conductive connection by means of said contact sections on a contact surface in contact with an assigned contact surface of a partial busbar or a DC-voltage connection conductor.

Of course, the features mentioned in the singular, in particular the power component, may also be present in the plural and the respective clamping section may also be present twice in the arrangement according to the invention, provided that this is not excluded per se.

It may be particularly advantageous for the presented arrangement if the DC-voltage connection conductor and the partial busbar connected thereto in a polarity-conforming manner each have two clamping sections arranged in a symmetrical manner with respect to the direction of current flow. In this case, the clamping sections assigned to one another can preferably also lie above one another in such a manner that they are bent away from one another and, as a result of their force-fitting connection, therefore have a spring force which additionally presses the contact sections against one another.

In one preferred configuration of the arrangement, the force-fitting connector is formed by means of a screw connection. In this case, the clamping sections assigned to one another can have cutouts which are aligned with one another, a screw of the screw connection penetrating these cutouts, and the force-fitting connector being formed by means of a screw nut. Alternatively, the clamping sections assigned to one another may have cutouts which are aligned with one another, one of these cutouts having an internal thread, and a screw of the screw connection penetrating these cutouts, and the force-fitting connector being formed when screwed to the internal thread.

An insulation device, in particular an insulation film, may preferably be arranged between the DC-voltage connection conductors and furthermore preferably also in a manner laterally projecting beyond said conductors. It is likewise preferred if an insulation device, in particular an insulation film, is arranged between the partial busbars and furthermore preferably also in a manner laterally projecting beyond said busbars. In this case, the two insulation devices may also degenerate into a common insulation device in another preferred embodiment.

It may be advantageous, in particular, if the power component is in the form of a power semiconductor module or a capacitor.

It goes without saying that the various configurations of the invention may be implemented individually or in any combinations in order to achieve improvements. In particular, the above-mentioned features and those which are explained here or below can be used not only in the specified combinations but also in other combinations which are not mutually exclusive or on their own without departing from the scope of the present invention.

Other objects and features of the present invention will become apparent from the following detailed description of the presently preferred embodiments, considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
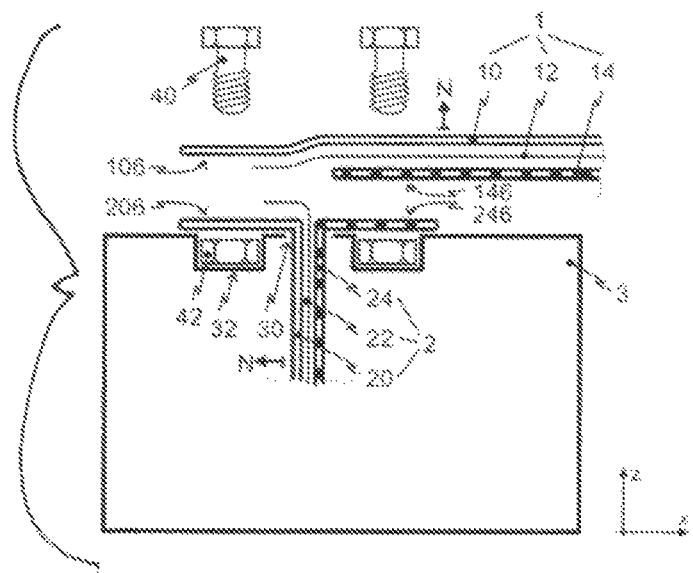
FIG. 1 shows a side view of a first arrangement according to the invention.

FIG. 1 shows a side view of a first arrangement according to the invention. A power component 3 which, without restricting generality, is depicted in the form of a power semiconductor module. The internal configuration of power semiconductor module 3 is fundamentally conventional in the art. In a manner which is likewise conventional in the art, power semiconductor module 3 has two DC-voltage connection conductors 2 which penetrate the housing thereof at a cutout 30 and are as closely adjacent as possible in their internal course inside power semiconductor module 3, that is to say, they are at a short distance in the direction of their normal vector N. This closely adjacent configuration extends close to contact sections 200, 240, but is no longer provided there because a flexible connection option for a DC-voltage busbar 1 is necessary here. Consequently, DC-voltage connection conductors 20, 24 each have a right-angle bend there, which bends face away from one another and are used to form two contact surfaces 206, 246 beside one another. With respect to the further specific configuration of contact sections 200, 240, reference is made here to FIG. 2A, in particular.

In a manner which is likewise conventional in the art, the housing of power semiconductor module 3 also has cutouts 32 for receiving screw nuts 42 for forming a force-fitting, electrically conductive connection between DC-voltage connection conductors 2 and partial busbars 10, 14 of DC-voltage busbar 1. With respect to the further specific configuration, reference is likewise made to FIG. 2A.

Depending on the voltage applied to DC-voltage connection conductors 20, 24, an insulation device 22 is provided therebetween at least in that region in which they run closely adjacent to one another. Insulation device 22 is in the form of an insulation film here in a manner conventional in the art. In order to comply with standard-conforming air and creepage paths, insulation film 22 is formed in such a manner that it laterally projects beyond DC-voltage connection conductors 20, 24 in their course from the plane of the drawing.

Furthermore, a DC-voltage busbar 1 is illustrated in a manner similar to an exploded drawing, DC-voltage busbar 1 connects, in a manner conventional in the art, power semiconductor module 3 to a capacitor or to another DC-voltage source or DC-voltage sink. DC-voltage busbar 1 has two partial busbars 10, 14 which are arranged closely adjacent to one another in the direction of their respective normal vector N there in a substantial section of their course to contact sections 100, 140 for the purpose of making electrically conductive contact with DC-voltage connection conductors 20, 24 of power semiconductor module 3 in a polarity-conforming manner. In other words, partial busbars 10, 14 are in the form of flat molded metal bodies which are arranged parallel to one another in a manner conventional in the art.

First partial busbar 10 of a first polarity extends to the assigned contact section 200 of first DC-voltage connection conductor 20 of power semiconductor module 3 and there has a contact section 100 having a contact surface 106 which is connected to the corresponding contact surface 206 of contact section 200 of first DC-voltage connection conductor 20 in a force-fitting manner.

Second partial busbar 14 of a second polarity extends only to the assigned contact section 240 of second DC-voltage connection conductor 24 of power semiconductor module 3 and there has a contact section 140 having a contact surface 146 which is connected to corresponding contact surface 246 of contact section 240 of second DC-voltage connection conductor 24 in a force-fitting manner.

Since contact surfaces 206, 246 of DC-voltage connection conductors 20, 24 of power semiconductor module 3 lie on a plane, first partial busbar 10 has, in its course, a projection which is in the form of a double right-angle bend and is used to arrange contact surface 106 of first partial busbar 10 in a plane with contact surface 146 of second partial busbar 14.

Depending on the voltage applied to partial busbars 10, 14, an insulation device 12 is provided therebetween at least in that region in which they run closely adjacent to one another. Insulation device 12 is in the form of an insulation film here in a manner conventional in the art. In order to comply with standard-conforming air and creepage paths, insulation film 12 is formed in such a manner that it laterally projects beyond partial busbars 10, 14 in their course from the plane of the drawing.

The respective force-fitting connections between corresponding contact surfaces, which, during connection, form the electrically conductive contact, of mutually assigned contact sections of the respective partial busbar and the respective DC-voltage connection conductor are effected by means of a connector. The connector is preferably in the form of a screw connection having two screws 40 in each case which are connected to screw nuts 42 of the housing of power semiconductor module 3. According to the invention, screws 40 do not penetrate the respective contact section, but rather penetrate their own clamping sections arranged to the side of the contact section, cf. also FIGS. 2A and 2B.

Figure 2A:
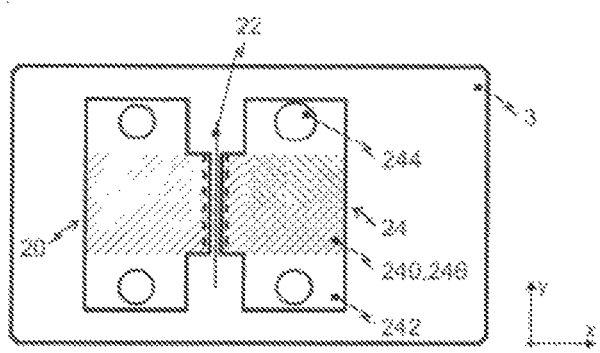
FIGS. 2A and 2B show plan views of this first arrangement in different planes.
Figure 2B:
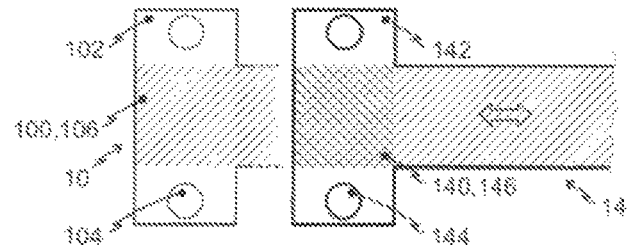

FIGS. 2A and 2B show a plan view of the first arrangement in different planes, in which case FIG. 2A shows the plan view of power semiconductor module 3, whereas FIG. 2B shows a plan view virtually from below, that is to say from the viewing direction of power semiconductor module 3, of partial busbars 10, 14 of DC-voltage busbar 1.

Power semiconductor module 3 according to FIG. 2A has a housing, cf. also FIG. 1, and two DC-voltage connection conductors 20, 24. Further connection conductors, in particular one or more AC-voltage connection conductors and control connection conductors which are present in a manner conventional in the art, are not illustrated here and in the remaining figures for reasons of clarity.

DC-voltage connection conductors 20, 24 project through a cutout 30 in the housing of power semiconductor module 3 and are closely adjacent in their course through the housing. During this course, an insulation device 22 is arranged between DC-voltage connection conductors 20, 24 and also in a manner laterally projecting beyond said conductors. Insulation device 22 may be in the form of an insulation film or else may be part of the plastic housing. Contact sections 200, 240 each having a contact surface 206, 246, only illustrated for the second, right-hand contact section by means of cross-hatching, are produced on the top side of the housing by chamfering DC-voltage connection conductors 20, 24 in different directions.

Two clamping sections 204, 244 are arranged for each DC-voltage connection conductor 20, 24 laterally beside contact sections 200, 240 in the direction of current flow, cf. the double-headed arrow in FIG. 2B, which clamping sections do not restrict the area, more precisely the surface area, of the contact surfaces and therefore do not form any bottleneck with a reduced current-carrying capacity for the flow of current from contact surfaces 206, 246 of DC-voltage connection conductors 20, 24 to those contact surfaces 106, 146, cf. FIG. 2B, of partial busbars 10, 14 of DC-voltage busbar 1. Clamping sections 202, 242 each have a cutout 204, 244, respectively, through which a screw 40 of the screw connection, described with respect to FIG. 1, can be arranged such that it extends therethrough.

FIG. 2B shows the two partial busbars 10, 14 of DC-voltage busbar 1. Both are in the form of flat molded metal bodies and have a uniform width and thickness and therefore also a uniform cross-sectional area in their course to contact sections 100, 140. In a manner corresponding to contact surfaces 206, 246 of DC-voltage connection conductors 20, 24 of power semiconductor module 3, partial busbars 10, 14 have contact surfaces 106, 146, illustrated as cross-hatching only for the right-hand contact section 140, that of second partial busbar 14. Contact sections 106, 146 of partial busbars 10, 14 have clamping sections 142 which are laterally arranged in the direction of current flow. These clamping sections 142 in turn have cutouts 144 which are aligned with cutouts 244 in clamping sections 242 of DC-voltage connection conductors 24 of power semiconductor module 3 and with screw nuts 42 which are arranged in a rotationally fixed manner in the housing of power semiconductor module 3, cf. FIG. 1.

In order to form the screw connection (not illustrated), two screws 40 for each polarity, cf. FIG. 1, extend through cutouts 144, 244 in respective clamping sections 142, 242 and are screwed to screw nuts 42.

An important advantage of the arrangement according to the invention is that neither the cross-sectional areas of the partial busbars which contribute to the current-carrying capacity nor the contact sections with their contact surfaces are restricted by the screw connections, as a result of which the current-carrying capacity of the connection between the respective DC-voltage connection conductor and the assigned partial busbar is not reduced by their connection. In addition, the closely adjacent configuration of the course of the DC-voltage connection conductors and of the partial busbars of the DC-voltage busbar, including the region of the electrically conductive connection between them, results in a particularly low leakage inductance.

Figure 3:
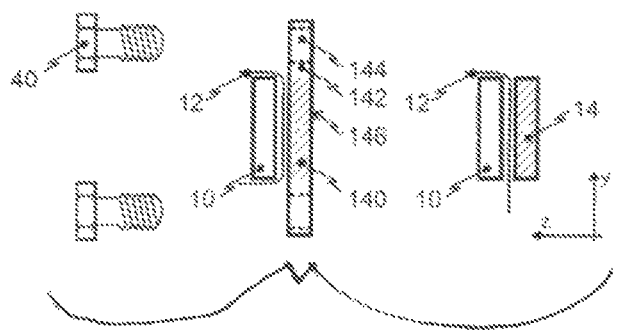
FIG. 3 shows different sectional views of the DC-voltage busbar of the first arrangement.

FIG. 3 shows different sectional views of DC-voltage busbar 1 of the first arrangement. The sectional view in the z direction at contact section 140 of second partial busbar 14 and first partial busbar 10 arranged parallel and closely adjacent to second partial busbar 14 is illustrated. The parallel course of the two partial busbars 10, 14 in their course to the contact point is likewise illustrated.

At contact section 140 of second partial busbar 14, first partial busbar 10 has a cross section having a cross-sectional area of identical design to that in the course to its contact section. For current conduction, second partial busbar 14 fundamentally has the same cross section as first partial busbar 10. Beside contact section 140, second partial busbar 14 also has a clamping section 142. The screw connection assigned to this clamping section 142 becomes clear here; only the associated screws 40 which project through cutouts 144 in the clamping section 142 are illustrated in a type of exploded illustration.

An insulation film 12 is arranged between partial busbars 10, 14. Insulation film 12 laterally overlaps first partial busbar 10 and is bent upwards, away from second partial busbar 14, on the sides. This configuration results not only in partial busbars 10, 14 being electrically insulated with respect to one another but also in the screw connection, in particular screw 40 itself, being electrically insulated with respect to the first partial busbar.

In the course of partial busbars 10, 14, the latter are arranged closely adjacent to one another and have the same width and the same cross-sectional area here. Insulation film 12 between partial busbars 10, 14 laterally projects in each case and may also be bent away in any desired direction, as in the case illustrated above.

Figure 4:
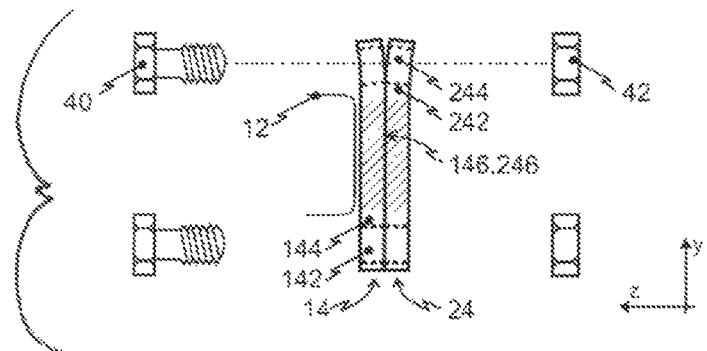
FIG. 4 shows two variants of a force-fitting connection of a DC-voltage connection conductor and a partial busbar.

FIG. 4 shows two variants of a force-fitting connection, here again a screw connection, with two screws 40 and two screw nuts 42, between a second DC-voltage connection conductor 24 and an assigned second partial busbar 14. The variant illustrated in the lower part has corresponding clamping sections 142, 242 of partial busbar 14 and of DC-voltage connection conductor 24 which each laterally project from contact sections 140, 240 and are parallel to one another.

In the second variant, clamping sections 142, 242 are bent away from one another, as a result of which, under the action of the screw connection, contact surfaces 146, 246 of the respective contact sections 140, 240 are pressed onto one another by an additional force component, a spring force. This again improves the quality of the electrically conductive connection.

Figure 5:
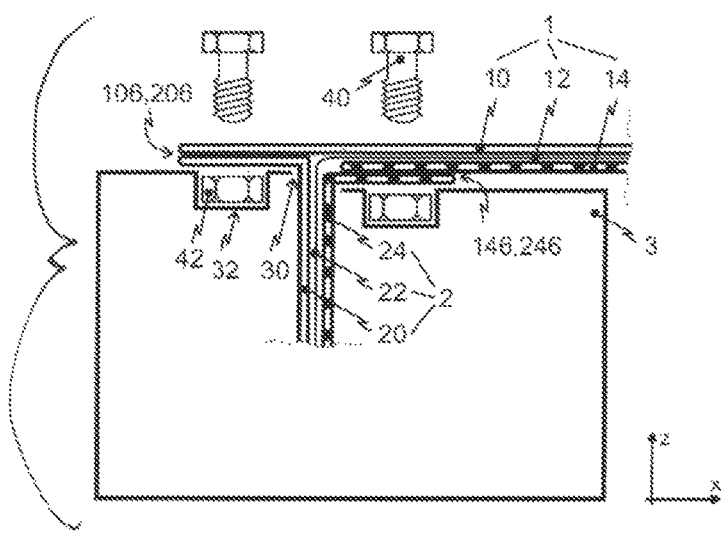
FIG. 5 shows a side view of a second arrangement according to the invention.

FIG. 5 shows a side view of a second arrangement according to the invention. This arrangement fundamentally corresponds to the arrangement according to FIG. 1, but here DC-voltage busbar 20, 24 is not depicted in an exploded illustration. In addition, first partial busbar 10 of DC-voltage busbar 1 does not have a right-angle bend here. The necessary height adjustment for connecting first partial busbar 10 to first DC-voltage connection conductor 20 is carried out by virtue of first DC-voltage connection conductor 20 having a contact section 200 which is arranged in an elevated position in comparison with that contact section 240 of second DC-voltage connection conductor 24.

Figure 6:
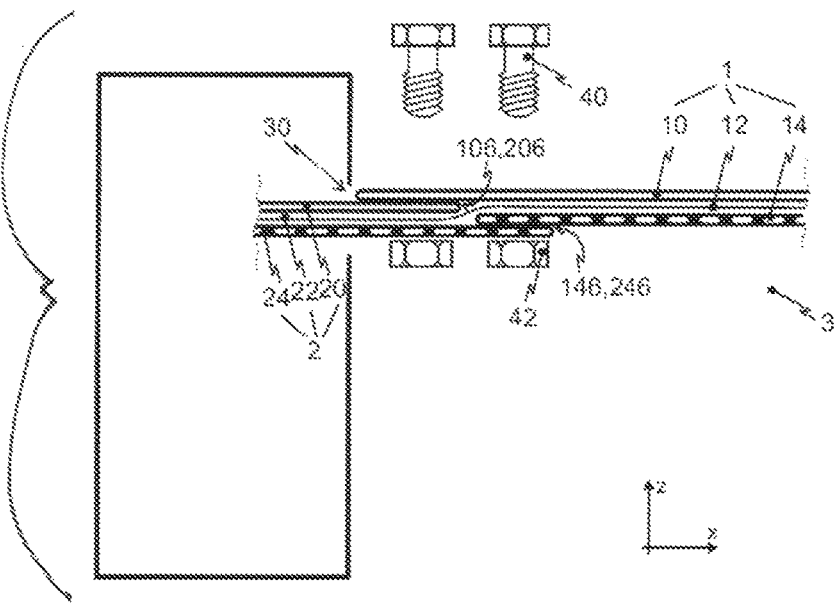
FIG. 6 shows a side view of a third arrangement according to the invention.

FIG. 6 shows a side view of a third arrangement according to the invention. A power component 3 which, without restricting generality, is here depicted in the form of a capacitor. This capacitor 3 has DC-voltage connection conductors 20, 24 which laterally emerge from the housing of the capacitor 3 and are themselves arranged parallel to one another in their course to, and in the region of, their contact sections 200, 240.

Partial busbars 10, 14 of DC-voltage busbar 1 are likewise themselves arranged parallel to one another in the course to, and at, their contact sections 100, 140.

Beside the contact sections, partial busbars 10, 14 and the respectively associated DC-voltage connection conductors 20, 24 each have clamping sections in the direction of current flow with a connector in the form of a screw connection, which clamping sections do not restrict the current-carrying capacity according to the invention and fundamentally form at least the partial busbars according to FIG. 2B. For the rest, the continuously closely adjacent configuration of the course of the DC-voltage connection conductors and of the partial busbars of the DC-voltage busbar, including the region of the electrically conductive connection between them, has a particularly low leakage inductance.

In principle, an insulation device 22 is illustrated again, which insulation device, here as part of capacitor 3, ensures the electrical insulation both of the DC-voltage connection conductors and of the partial busbars, with reference symbol 12 there, at least in the course beyond their contact sections.

In the preceding Detailed Description, reference was made to the accompanying drawings, which form a part of this disclosure, and in which are shown illustrative specific embodiments of the invention. In this regard, directional terminology, such as "top", "bottom", "left", "right", "front", "back", etc., is used with reference to the orientation of the Figure(s) with which such terms are used. Because components of embodiments can be positioned in a number of different orientations, the directional terminology is used for purposes of ease of understanding and illustration only and is not to be considered limiting.

Additionally, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement of a power semiconductor module comprising:
   a DC-voltage busbar having first and second partial busbars through which a current may flow in a predetermined direction, each of said first and second partial busbars having a contact section, a first width, a first cross-sectional area in their course to their respective contact sections, and
   a clamping section laterally beside said contact section in said direction of current flow, said first and second partial busbars being arranged closely adjacent to one another in said course in the direction of their respective normal vector there;
   a power component having first and second DC-voltage connection conductors, said first and second DC-voltage connection conductors being flat, and each having a contact section, a first width, a first cross-sectional area in a course to their respective contact sections, and
   a clamping section laterally beside the respective contact section in said direction of current flow, said first and second DC-voltage connection conductors being arranged closely adjacent to one another in said course in the direction of their respective normal vector there; and
   a connector for securing and electrically conductively connecting said clamping sections of said partial busbars to respective ones of said clamping sections of said DC-voltage connection conductors above one another in a flat and force-fitting manner;
   whereby said contact section of at least one of said first and second DC-voltage connection conductors is electrically connected in a polarity-conforming manner to at least one of said respective contact sections of said partial busbars; and
   whereby the respective contact sections of said partial busbars and said DC-voltage connection conductors lie directly flat on one another with respective contact surfaces assigned thereto;
   wherein each of said partial busbars and each of said DC-voltage connection conductors has at least two clamping sections arranged symmetrically therein with respect to the direction of current flow.

2. The arrangement of claim 1, wherein said connector includes a screw.

3. The arrangement of claim 2,
   wherein each of said clamping sections of said partial busbars and said clamping sections of said DC-voltage connection conductors has a cutout;
   wherein said cutouts of said clamping sections of said partial busbars and said clamping sections of said DC-voltage connection conductors are aligned with one another;
   wherein said screw is at least partially disposed within said cutouts; and
   wherein said connector further includes a screw nut for engaging said screw.

4. The arrangement of claim 3,
   wherein each of said clamping sections of said partial busbars and said clamping sections of said DC-voltage connection conductors has a cutout;

wherein said cutouts of said clamping sections of said partial busbars and said clamping sections of said DC-voltage connection conductors are aligned with one another;
wherein at least one of said cutouts has an internal thread; and
wherein said screw is at least partially disposed within said cutouts;
whereby said screw is configured to engage said internal thread of said at least one of said cutouts.

5. The arrangement of claim 1, wherein said connector includes a screw.

6. The arrangement of claim 5,
wherein each of said clamping sections of said partial busbars and said clamping sections of said DC-voltage connection conductors has a cutout;
wherein said cutouts of said clamping sections of said partial busbars and said clamping sections of said DC-voltage connection conductors are aligned with one another;
wherein said screw is at least partially disposed within said cutouts; and
wherein said connector further includes a screw nut for engaging said screw.

7. The arrangement of claim 6,
wherein each of said clamping sections of said partial busbars and said clamping sections of said DC-voltage connection conductors has a cutout;
wherein said cutouts of said clamping sections of said partial busbars and said clamping sections of said DC-voltage connection conductors are aligned with one another;
wherein at least one of said cutouts has an internal thread; and
wherein said screw is at least partially disposed within said cutouts;
whereby said screw is configured to engage said internal thread of said at least one of said cutouts.

8. The arrangement of claim 1, wherein said clamping sections of said partial busbars and said clamping sections of said DC-voltage connection conductors are bent away from one another, whereby, as a result of the force-fitting connection, they exert a spring force on each other which additionally presses the respective contact sections thereof against one another.

9. The arrangement of claim 8, wherein said connector includes a screw.

10. The arrangement of claim 9,
wherein each of said clamping sections of said partial busbars and said clamping sections of said DC-voltage connection conductors has a cutout;
wherein said cutouts of said clamping sections of said partial busbars and said clamping sections of said DC-voltage connection conductors are aligned with one another;
wherein said screw is at least partially disposed within said cutouts; and
wherein said connector further includes a screw nut for engaging said screw.

11. The arrangement of claim 10,
wherein each of said clamping sections of said partial busbars and said clamping sections of said DC-voltage connection conductors has a cutout;
wherein said cutouts of said clamping sections of said partial busbars and said clamping sections of said DC-voltage connection conductors are aligned with one another;
wherein at least one of said cutouts has an internal thread; and
wherein said screw is at least partially disposed within said cutouts;
whereby said screw is configured to engage said internal thread of said at least one of said cutouts.

12. The arrangement of claim 1, further comprising an insulator arranged between said DC-voltage connection conductors.

13. The arrangement of claim 12, wherein said insulator is an insulating film.

14. The arrangement of claim 12, wherein said insulator is disposed so as to project laterally beyond said DC-voltage connection conductors.

15. The arrangement of claim 1, further comprising an insulator arranged between said partial busbars.

16. The arrangement of claim 15, wherein said insulator is an insulating film.

17. The arrangement of claim 15, wherein said insulator is disposed so as to project laterally beyond said busbars.

18. The arrangement of claim 1, wherein said power component is a power semiconductor module.

19. The arrangement of claim 1, wherein said power component is a capacitor.

* * * * *